Figure 1:
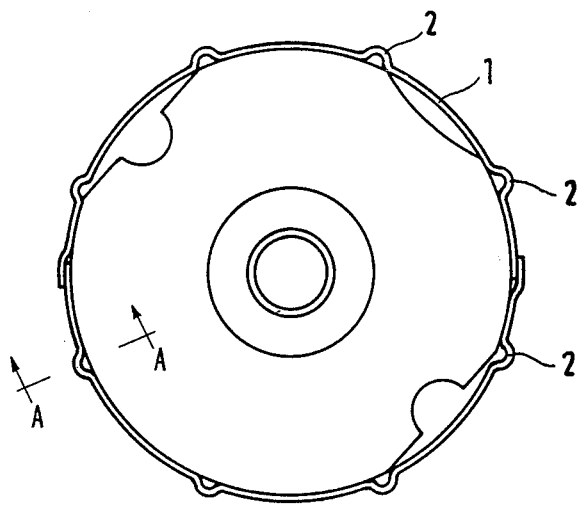
Figure 1A:
Figure 1B:
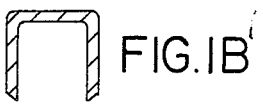
Figure 1C:

United States Patent [19]

Maier

[11] Patent Number: 4,947,626
[45] Date of Patent: Aug. 14, 1990

[54] CONDITIONER FOR AGRICULTURAL HARVESTING MACHINES

[75] Inventor: Martin Maier, Gottmadingen, Fed. Rep. of Germany

[73] Assignee: Greenland GmbH & Co. KG, Fed. Rep. of Germany

[21] Appl. No.: 321,573

[22] Filed: Mar. 9, 1989

[30] Foreign Application Priority Data

Mar. 10, 1988 [DE] Fed. Rep. of Germany ....... 3808031

[51] Int. Cl.$^5$ ...................... A01D 80/02; A01D 43/10
[52] U.S. Cl. ......................................... 56/364; 56/400; 56/400.02
[58] Field of Search ................. 56/193, 364, 365, 367, 56/370–372, 377, 400, 400.02

[56] References Cited

U.S. PATENT DOCUMENTS 3,921,376 11/1975 Hofer ..................................... 56/400
4,660,362 4/1987 Klinner ................................. 56/364

Primary Examiner—Jerome W. Massie
Assistant Examiner—Matthew Smith
Attorney, Agent, or Firm—Laff, Whitesel, Conte & Saret

[57] ABSTRACT

The conditioner for agricultural harvesting machines, in particular for rotary mowers, comprises a substantially cylindrical hollow shaft, which extends transversely to the longitudinal axis of the machine and which - when seen in the direction of movement of the machine - is arranged behind the mowing discs, said hollow shaft having secured thereto a plurality of V-shaped pairs of fingers extending radially outwards. The surface of the hollow shaft is provided with a plurality of spaced, peripheral, outwardly projecting hollow ribs, which extend parallel to the longitudinal axis of the hollow shaft and substantially throughout the whole length of said hollow shaft, whereas each V-shaped pair of fingers is fixedly connected to a supporting base, the longitudinal axis of which extends in the connection direction of the two fingers and the underside of which has a shape adapted to the hollow rib and to the surface of the hollow shaft.

8 Claims, 4 Drawing Sheets

CONDITIONER FOR AGRICULTURAL HARVESTING MACHINES

The present invention refers to a conditioner for agricultural harvesting machines, in particular for rotary mowers, comprising a substantially cylindrical hollow shaft, which extends transversely to the longitudinal axis of the machine and which—when seen in the direction of movement of the machine—is arranged behind the mowing discs, said hollow shaft having secured thereto a plurality of V-shaped pairs of fingers extending radially outwards.

By means of rotary mowers, it is possible to achieve high area capacities so that also short periods of fine weather can fully be utilized. They permit a uniform cut, without any dirt being introduced in the fodder, and uniform, loose swathes are deposited in the case of which the drying process can begin immediately. The uniform rotation of the rotary discs results in uniform mowing without any wavy cut and without any damage being caused to the sod.

A reduction of the drying period can be achieved by the use of a conditioner, which—when seen in the direction of movement—is arranged behind the mowing discs of the rotary mower and which the power take-off shaft of the tractor drawing the rotary mower causes to carry out a rotary motion. Depending on the type of fodder and on the weather, this conditioning will reduce the drying period by half a day up to two days, and, especially in cases in which large batches are ensilaged, this will save a substantial amount of time. Such a conditioner normally consists of a plurality of V-shaped pairs of fingers provided on a hollow shaft, which is constructed as a rotor, in a spiral-shaped arrangement. This has the effect that the fodder supplied by the mowing discs is conditioned in such a way that the pairs of fingers mechanically act on the evaporation-retarding wax layer and slightly kink the blades of the fodder. The fodder will thus fall down bulkily in fast drying swathes, and it will fall down in a continuous flow of material without blockage.

The conditioning intensity can be controlled by adjusting a deflector, short harvested crops being directed by swath guide boards, the swath shape being determined by the position of a discharge flap and the speed of the rotor being adapted to be adjusted to the special fodder.

EP-pat. 76 686 discloses a conditioner for conveying and/or treating harvesting crops, said conditioner comprising a carrier means which has secured thereto a plurality of outwardly extending carrying elements, each of said carrying elements being provided with a base section through which it is secured to the carrier means and with two sections for carrying along the harvested crops. The carrier means comprises a base section and a shielding section, the latter being arranged on the front of the base section of the crop carrying element stationarily relative to the intended movement of said carrying element and each of the carrying sections being inclined relative to the carrier means in a plane substantially transversely to the intended movement of the carrying element for carrying along the harvested crops. The carrying elements are arranged on the carrier means via guide means defining abutting areas, said carrying elements being adapted to swerve relative to said carrier means by sliding movements along the guide means.

The carrier means is provided with a transversely directed channel portion, and the carrying elements are secured to the inner surface of one of the flanges of said channel portion so that each connecting section of the two V-shaped arms of the carrying element lies within the channel portion. The arms of the carrying elements extend through openings which are provided in the carrier means and the sides of which define the guide means for the arms of the carrying elements.

The production of such a conditioner requires a large amount of material and time and is, consequently, expensive. Furthermore, such a conditioner shows the disadvantage that a pivotal displacement of the V-shaped fingers of the carrying elements about the longitudinal axis in their bolt connection with the carrier means in response to impact on an obstacle cannot be excluded.

The present invention is based on the task of providing a conditioner, which can be produced easily and cheaply and which permits an exchange of the V-shaped pairs of fingers without any difficulties, said V-shaped pairs of fingers maintaining their position on the outer wall of the hollow shaft, however, fixedly and immovably after having been installed.

Taking as a basis a conditioner of the type specified in detail at the beginning, the following features are suggested as a a solution of the task: that the surface of the hollow shaft is provided with a plurality of spaced, peripheral, outwardly projecting hollow ribs, which extend parallel to the longitudinal direction of the hollow shaft and substantially throughout the whole length of said hollow shaft, and that each V-shaped pair of fingers is fixedly connected to a supporting base, the longitudinal axis of which extends in the connection direction of the two fingers and the underside of which has a shape adapted to the shape of the hollow rib and to the surface of the hollow shaft.

In accordance with an advantageous embodiment, the cross-section of the hollow ribs has the shape of a triangle or of a semioval.

For fastening the V-shaped pairs of fingers, the hollow shaft is provided with a plurality of elongate openings whose longitudinal direction extends at right angles to the longitudinal axis of the hollow rib and whose centres coincide with the vertices of the hollow ribs; in accordance with an advantageous embodiment, the openings of neighbouring hollow ribs are displaced relative to one another with regard to a cross-section through the hollow shaft.

In accordance with an advantageous embodiment, the supporting base of the V-shaped pairs of fingers is provided with a central opening, which is adapted to have inserted therein a holding bolt whose lower end extends up to and into the interior of the hollow shaft and is provided with a clamping member whose surface, which abuts on the underside of the hollow rib, is provided with a shaped adapted to said hollow rib.

The conditioner according to the present invention provides the advantage that the V-shaped pairs of fingers can be installed rapidly and by means of small number of manipulations. For this purpose, the clamping members secured to the underside of the holding bolts are introduced through the elongate openings into the interior of the hollow shaft where they are rotated by 90° so that the upper side of the clamping members engages the interior of the hollow ribs, and, subsequently, they are reliably secured in position by tightening of a nut. The large areas of contact through which the supporting base abuts on the hollow ribs on the one hand and through which the upper side of the clamping member abuts on the underside of the hollow ribs on the other hand, provides a reliable friction-type locking between the pairs of fingers and the hollow shaft so that even in the case of an impact on comparatively large obstacles, a rotary or a pivotal displacement of the pairs of fingers about the longitudinal axis of the holding bolt is absolutely impossible. Notwithstanding this, the use of an appropriate material, e.g. plastic, for the V-shaped pairs of fingers will provide sufficient elasticity for avoiding destruction in response to impact on an obstacle.

In the following, the application will be explained in detail on the basis of the drawing in which a preferred embodiment is shown.

Figures 5, 6:
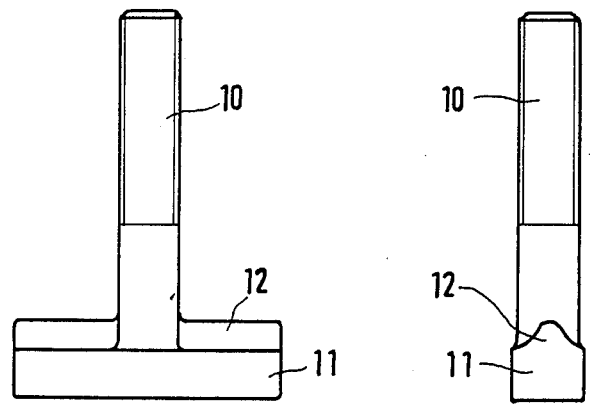
Figure 2:
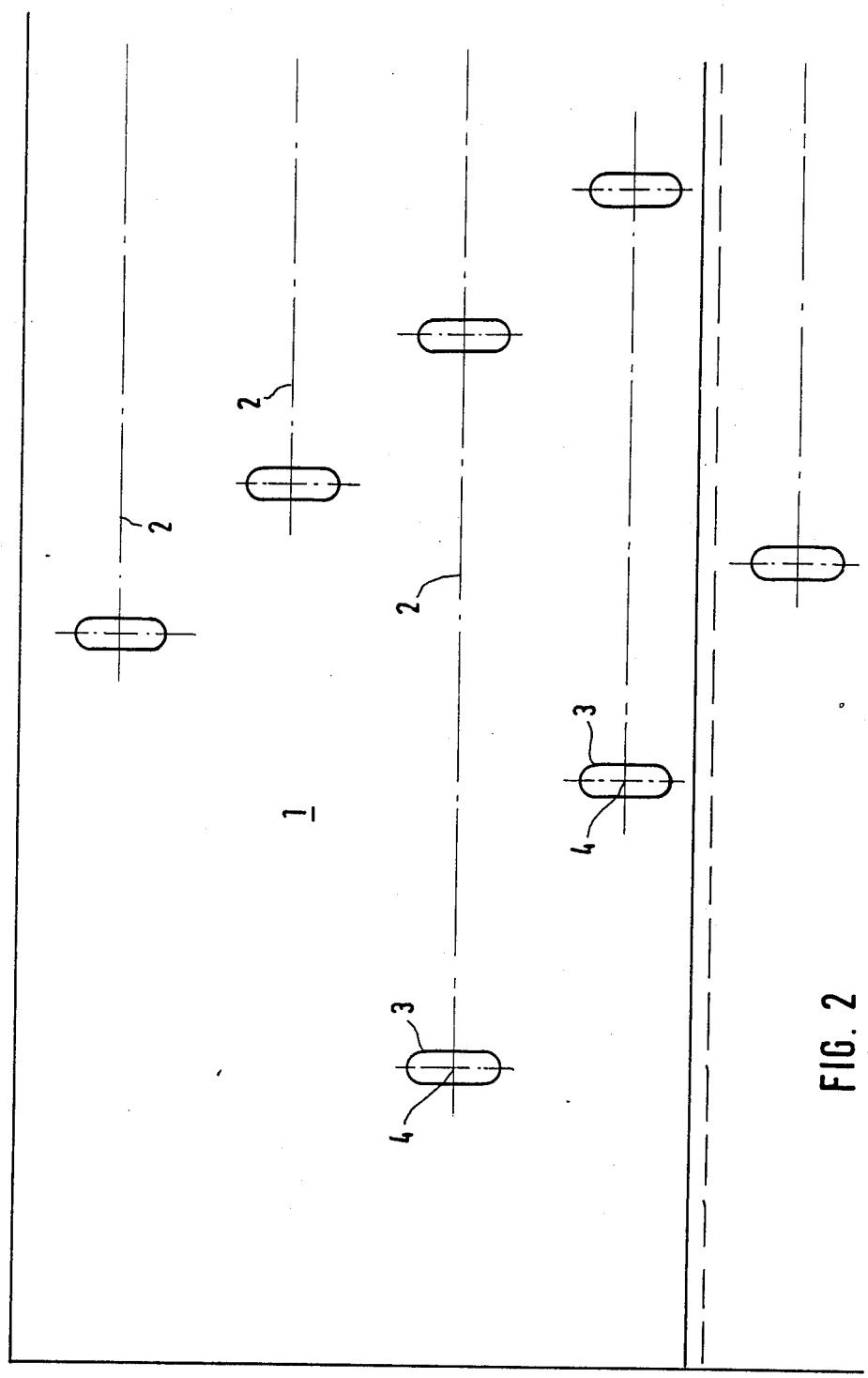
Figure 3:
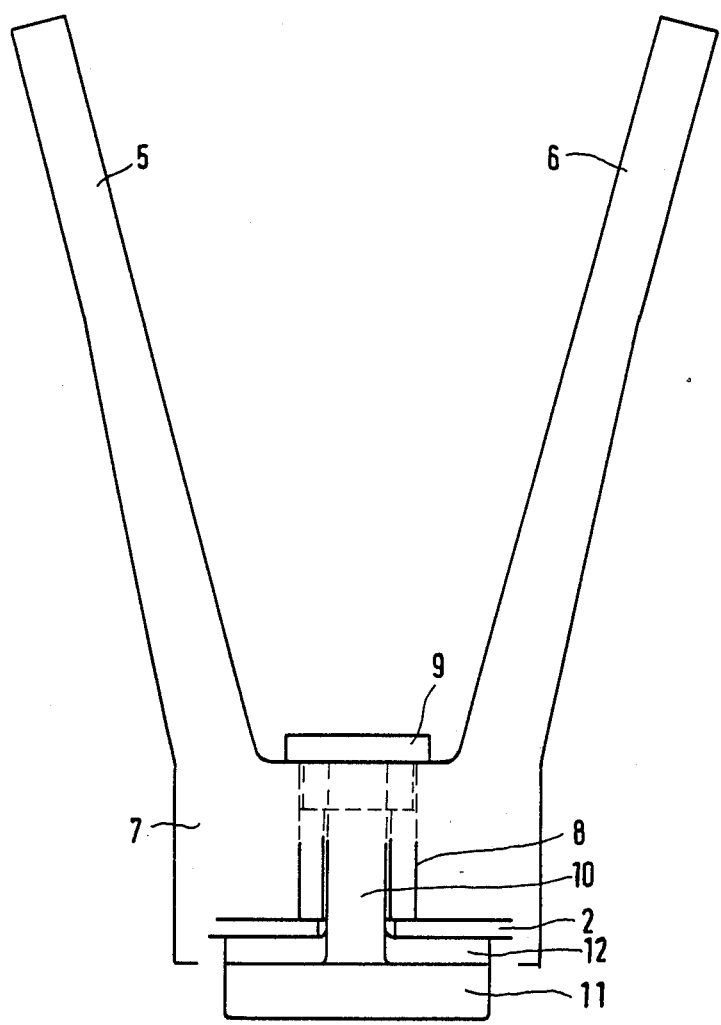
Figure 4:
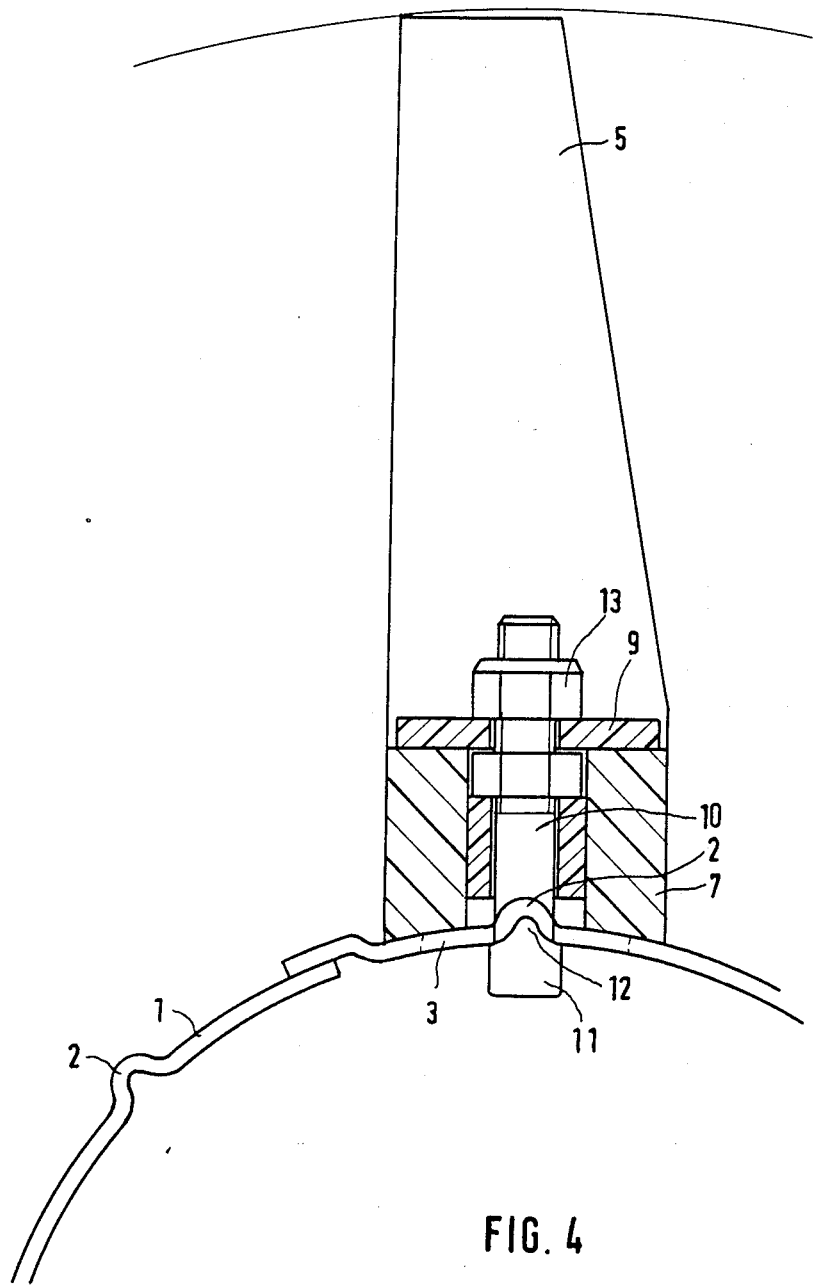

FIG. 1 shows a cross-section through a hollow shaft having the structural design according to the invention, FIGS. 1A–1D show alternative cross sections of hollow ribs, taken along line A—A of FIG. 1;

FIG. 2 shows the way in which the openings are arranged on the rolled out surface of the hollow shaft, FIG. 3 shows a cross-section through a V-shaped pair of fingers, FIG. 4 shows a cross-section through the V-shaped pair of fingers and through part of the hollow shaft, said cross-section being displaced by 90° relative to that of FIG. 3, FIG. 5 shows a side view of a holding bolt and FIG. 6 shows a side view of this holding bolt displaced by 90° relative to FIG. 5.

Figure 1D:

In FIG. 1, reference numeral 1 is used for a hollow shaft, which is used as a rotor for a conditioner. The surface of the hollow shaft 1 is provided with a plurality of spaced, peripheral, outwardly projecting hollow ribs 2, which extend parallel to the longitudinal axis of the hollow shaft 1 and substantially throughout the whole length of said hollow shaft; said ribs can have an arbitrary cross-section, e.g. a semicircular (FIG. 1A), a rectangular (FIG. 1B), a triangular (FIG. 1C) etc. cross-section. In the case of the embodiment shown for FIG. 1, the hollow shaft 1 is provided with eight hollow ribs 2, said hollow ribs having an oval cross-section (FIG. 1D).

As can be seen in FIG. 2, which shows part of a rolled out hollow shaft, a plurality of elongate openings 3 are arranged on the surface of said hollow shaft, the longitudinal direction of said openings extending at right angles to the longitudinal axis of the hollow ribs 2 and the centres 4 of said openings coinciding with the vertices of the hollow ribs 2. Furthermore, it can be seen from FIG. 2 that the openings 3 of neighbouring hollow ribs 2 are arranged such that they are displaced relative to one another with regard to a cross-section through the hollow shafts 1.

FIG. 3 shows a cross-section through a V-shaped pair of fingers in a plane parallel to the longitudinal axis of the hollow shaft. Reference numerals 5, 6 refer to the two fingers, which are used for the actual conditioning of the harvested crops. The two fingers 5, 6 are fixedly connected to a supporting base 7, the longitudinal axis of which extends in the connection direction of the two fingers 5, 6 and the underside of which has a shape adapted to the hollow rib 2 and to the surface of the hollow shaft 1. The supporting base 7 is provided with a central opening 8, which is adapted to have inserted therein a holding bolt 10 whose lower end extends up to and into the interior of the hollow shaft 1 and is provided with a clamping member 11 whose surface 12, which abuts on the underside of the hollow rib 2, is provided with a shape adapted to the hollow rib. Reference numeral 9 refers to a washer or to a holding flange.

FIG. 4 shows a cross-section—displaced by 90° relative to the representation of FIG. 3—through the V-shaped pair of fingers in a plane defining a cross-section through the hollow shaft. This figure shows in a particularly clear manner the way in which the V-shaped pair of fingers 5, 6 is fastened to the hollow shaft 1. The holding bolt 10, which extends through the central opening 8 provided in the supporting base 7, with its clamping member 11 is introduced into the interior of the hollow shaft 1 through the opening extending transversely to the longitudinal direction of the rib 2, and there it is rotated by 90°. Subsequently, the nut 13 is fastened, whereby the surface 12 of the clamping member 11, which is adapted to the shape of the rib 2, will penetrate into the interior of the hollow rib 2 and adhere to the configuration of said hollow rib. The underside of the supporting base 7 is adapted to the curved surface of the hollow shaft 1 and the central part of the supporting base 7 is adapted to the surface of the hollow rib 2 so that an excellent clamping effect is achieved between the supporting base 7 and the hollow shaft 1.

FIGS. 5 and 6 show two side views—displaced by 90° relative to each other—of the holding bolt 10 with the clamping member 11 and of the surface 12 adapted to the interior shape of the hollow rib 2.

The holding bolt 10, which defines together with the clamping member 11 a T-shape, is constructed as an integral forged piece. The length of the longitudinal axis of the clamping member 11 corresponds essentially to the length of the longitudinal axis of each opening 3.

The conditioner according to the invention can be produced easily and cheaply, since it only requires a minimal amount of assembly work.

The V-shaped pairs of fingers, which are made of a plastic material, have a certain elasticity so that they can get out of the way of obstacles in spite of the high clamping effect of the supporting base on the hollow shaft. Also after possible damage or destruction, these parts can be exchanged easily and at a reasonable price.

I claim:

1. A conditioner for an agricultural harvesting machine, said harvesting machine being adapted to move in a particular direction, said conditioner comprising a hollow shaft mounted transversely with respect to said particular direction and at a location general near the rear of said machine;

said shaft having a surface with a plurality of spaced, peripheral, outwardly projecting, hollow, corrugational ribs (2) extending parallel to an axis of said shaft and projecting radially outward from said surface, said surface being pierced by longitudinally displaced holes along the corrugation of said ribs; and a plurality of V-shaped pairs of fingers (5, 6) joined at a common supporting base (7) for extending radially outwardly from said hollow shaft;

said supporting base (7) having an underside shaped to received and be attached to said outwardly projecting ribs (2) by a fastener passing through one of said holes, whereby said V-shaped fingers may be attached to the outside of said surface.

2. A conditioner according to claim 1, characterized in that the cross-section of the hollow rib (2) has the shape of a triangle.

3. A conditioner according to claim 1, characterized in that the cross-section of the hollow ribs (2) has the shape of a semioval.

4. A conditioner according to claim 1, characterized in that the hollow shaft is provided with a plurality of elongate openings (3) whose longitudinal direction extends at right angles to the longitudinal axis of the hollow ribs (2) and whose centers (4) coincide with vertices of the hollow ribs (2).

5. A conditioner according to claim 4, characterized in that the openings (3) of neighbouring hollow ribs are displaced relative to one another with regard to a cross-section through the hollow shaft.

6. A conditioner according to claim 1, characterized in that the supporting base (7) is provided with a central opening (8), which has inserted therein a holding bolt (10) whose lower end extends up and into the interior of the hollow shaft (1) and is provided with a clamping member (11) whose surface (12), which abuts on the underside of the hollow rib (2), is provided with a shape adapted to said hollow rib.

7. A conditioner according to either claim 4 or claim 6, characterized in that the longitudinal axis of the clamping member (11) has substantially the same length as the longitudinal axis of the opening (3).

8. A conditioner according to claim 6, characterized in that the holding bolt (10) and the clamping member jointly define a T-shape and are constructed as an integral forged piece.

* * * * *